(12) United States Patent
Golba et al.

(10) Patent No.: US 7,642,308 B2
(45) Date of Patent: Jan. 5, 2010

(54) NANONYLON COMPOSITES PREPARED BY CHAIN EXTENSION REACTIVE EXTRUSION

(75) Inventors: Joseph C. Golba, Avon Lake, OH (US); Roger W. Avakian, Aurora, OH (US); William F. Boye, Westchester, PA (US)

(73) Assignee: PolyOne Corporation, Avon Lake, OH (US)

( * ) Notice: Subject to any disclaimer, the term of this patent is extended or adjusted under 35 U.S.C. 154(b) by 71 days.

(21) Appl. No.: 12/095,962

(22) PCT Filed: Dec. 5, 2006

(86) PCT No.: PCT/US2006/061612

§ 371 (c)(1),
(2), (4) Date: Jun. 3, 2008

(87) PCT Pub. No.: WO2007/123582

PCT Pub. Date: Nov. 1, 2007

(65) Prior Publication Data

US 2008/0287584 A1 Nov. 20, 2008

Related U.S. Application Data

(60) Provisional application No. 60/749,255, filed on Dec. 9, 2005.

(51) Int. Cl.
C08K 3/22 (2006.01)
C08K 3/34 (2006.01)
C08L 77/02 (2006.01)
C08G 69/14 (2006.01)
C08G 69/46 (2006.01)

(52) U.S. Cl. ...................................... 524/413; 524/445
(58) Field of Classification Search ................. 524/413, 524/445
See application file for complete search history.

(56) References Cited

U.S. PATENT DOCUMENTS

| | | | |
|---|---|---|---|
| 4,739,007 A | 4/1988 | Okada et al. | |
| 5,846,637 A | 12/1998 | Malhotra et al. | |
| 6,423,768 B1 * | 7/2002 | Khouri | 524/445 |
| 6,552,113 B2 | 4/2003 | Bagrodia et al. | |
| 6,586,500 B2 | 7/2003 | Bagrodia et al. | |
| 6,596,803 B2 | 7/2003 | Lan et al. | |
| 6,605,655 B1 | 8/2003 | Kato et al. | |
| 2002/0137834 A1 | 9/2002 | Barbee et al. | |
| 2003/0153659 A1 * | 8/2003 | Hsiao et al. | 524/186 |

OTHER PUBLICATIONS

Karayan et al. ("Cesa-extend a User Friendly Technology to Enhance Reprocessing and Recycling of Condensation Plastics" GPEC 2004 Paper Abstract #52[2004]).*
Karayan et al., "Cesa-extend a User Friendly Technology to Enhance Reprocessing and Recycling of Condensation Plastics" GPEC 2004 Paper Abstract #52 (2004).

* cited by examiner

*Primary Examiner*—Kelechi C Egwim
(74) *Attorney, Agent, or Firm*—John H. Hornickel

(57) ABSTRACT

Chain-extended nanonylon is made from the reaction of oligomeric nanonylon and chain-extending agents. Such chain-extended nanonylon contains concentrations of organoclay exceeding 10 weight percent. High concentrations of organoclay permit the chain-extended nanonylon to be used as either a concentrate or a compound that provides good barrier properties for thermoplastic articles made from the chain-extended nanonylon.

18 Claims, 2 Drawing Sheets

NANONYLON COMPOSITES PREPARED BY CHAIN EXTENSION REACTIVE EXTRUSION

CLAIM OF PRIORITY

This application claims priority from U.S. Provisional Patent Application Ser. No. 60/749,255 bearing and filed on Dec. 9, 2005, which is incorporated by reference.

FIELD OF THE INVENTION

This invention concerns composites of polyamide and organoclay which contain concentrations of organoclay in excess of ten weight percent.

BACKGROUND OF THE INVENTION

The mixture of organoclays and polyamides, commonly called nanonylons, is highly desired because the organoclays can contribute barrier properties to polyamides for food packaging and other situations where the contained product within packaging must not leach, escape, or decay. Polyamides have been useful since the mid-20$^{th}$ Century. Organoclays, nanoclays intercalated with organic ions, such as quaternary ammonium, have become useful in the last decade.

Presently, nanonylons can be made using two conventional processes: (1) melt mixing of the organoclay into the previously polymerized nylon, in which the clay is added to a nylon melt by mechanical action; and (2) in-situ polymerization of the nylon in the presence of the organoclay, in which a batch of monomer such as caprolactam is brought to polymerization in a vessel also containing organoclay.

An example of melt mixing is found in U.S. Pat. No. 6,605,655 (Kato et al.). An example of in-situ polymerization is found in U.S. Pat. No. 4,739,007 (Okada et al.).

SUMMARY OF THE INVENTION

Unfortunately, there are difficulties with both preparation methods for nanonylons.

Melt mixing of organoclay with pre-polymerized nylon fails to achieve the extent of dispersion required for establishing the full benefits of the organoclay throughout the bulk of the nylon, which fails to approach optimized barrier properties for nanonylon films, containers and other articles in which limitation of transport through the nanonylon is highly desired. Moreover, melt mixing with too high a concentration of organoclay can create viscosity problems in the mixing device.

In-situ polymerization of nylon from monomer in the presence of organoclay ("polymerized nanonylon") currently has a practical limit of about 8% concentration by weight of the organoclay in the nanonylon, above that concentration the polymerized nylon containing the organoclay is often too viscous for convenient removal from the reaction chamber. Therefore, while an 8% nanonylon may be suitable for a nanonylon compound, it is not suitable for a nanonylon concentrate, an intermediate product which is sold to customers to extrude or mold with a "let-down" dilution of the concentrate in the presence of additional nylon, other polymers, other compounding ingredients, and the like.

Thus, the problem in the art is that nanonylon presently has a practical concentration limit of about 8%, while there are many who desire a concentration of organoclay in a concentrate that exceeds well beyond 8%.

The present invention solves this problem by using chain extension chemistry in a reactive extrusion process.

More precisely, the present invention begins with a preliminary low molecular weight nanonylon to make a final high molecular weight nanonylon.

The preliminary nanonylon is a mixture of organoclay with nylon having a low molecular weight. Thus, the starting material for the process of the present invention is a polymerized nanonylon of low molecular weight, sometimes also called an "oligomer". For purposes of this invention, the starting material will be called "oligomeric nanonylon".

Oligomeric nanonylon is commercially available because it can be prepared without encountering the viscosity problems encountered by the preparation of "polymerized nanonylon". Because the polymerization reaction of monomer-s, such as caprolactam, is halted before the molecular weight of the nylon becomes excessive, in terms of viscosity, the oligomeric nanonylon can be prepared in a batch reactor without reaching the limit of viscosity to impede the removal of the reacted product, also called a "drop" of the polymerized nylon.

With conventional chain extension agents, the present invention takes oligomeric nanonylon and extends the chains of nylon, making a nylon with higher molecular weight, higher melt flow index, greater viscosity, etc. while retaining essentially the same amount of the higher concentration of organoclay therewithin in a condition as dispersed as the organoclay has been in the oligomeric nanonylon. For purposes of this invention, to distinguish the product of this invention from "polymerized nanonylon", the product of this invention will be called "chain-extended nanonylon".

Thus, one aspect of this invention is a process for converting oligomeric nanonylon into chain-extended nanonylon. That process uses a continuous reaction vessel such as an extruder in which the dwell time of the oligomeric nanonylon is sufficient to complete chain extension to a desired level, thus forming a chain-extended nanonylon which can be used for subsequent dilution into a thermoplastic compound or be used as a compound itself for situations where a very high concentration of organoclay is desired in the final molded or extruded article.

Another aspect of the present invention is the chain-extended nanonylon formed by the process of the present invention. Irrespective of how this chain-extended nanonylon has been made, because of the viscosity and dispersion problems with conventional methods of making polymerized nanonylon, it is believed that a new product has been invented: a nanonylon having an organoclay concentration exceeding 10 weight percent, desirably exceeding 25 weight percent, and preferably exceeding 35 weight percent, a multi-fold increase in organoclay concentration not previously commercially available as an intermediate product (concentrate) or as a final product (compound) in the field of nanonylon composites.

A third aspect of the present invention is the use of chain-extended nanonylon in the manufacture of a thermoplastic compound, suitable for extruding or molding into a variety of article forms, such as films, fibers, vessels, etc.

A fourth aspect of the present invention is the article made from the chain-extended nanonylon.

Features and advantages of the invention will be explained below while discussing the embodiments.

EMBODIMENTS OF THE INVENTION

Oligomeric Nanonylon

Figure 1:
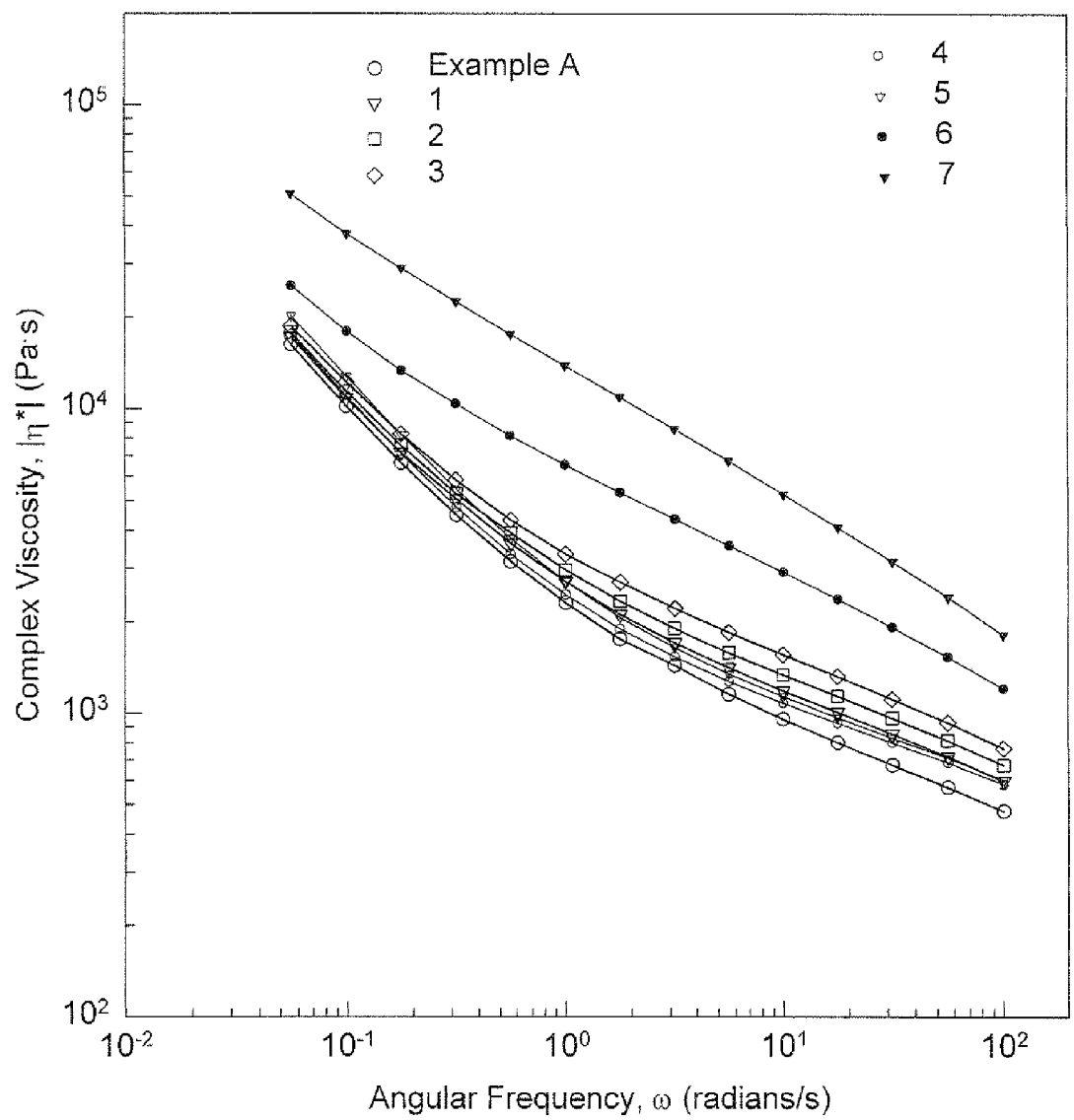
FIG. 1 is plot of complex viscosity relative to angular frequency for Comparative Example A and Examples 1-7.

The chain-extended nano nylon is dependent on the content and properties of the oligomeric nanonylon. Briefly stated, it is known that an oligomeric nanonylon containing as much as 20 weight percent of organoclay is commercially available by or through Nanocor, Inc. of Arlington Heights, Ill., USA. It has been measured that the 20 weight percent organoclay has a melt flow index of about 73 g/10 min. @ 235° C. and 1.4.9 Kg of force. Nanocor, Inc. is a world leader in the manufacture and sale of organoclays and organoclay concentrates.

As technology advances to create oligomeric nanonylons with organoclay concentrations exceeding even 20 weight percent, this invention will be just as suitable for such new oligomeric nanonylons.

To achieve a 20 weight percent oligomeric nanonylon, an in-situ polymerization of caprolactam (cyclic compounds represented, which undergo ring-opening polymerization to form polyamides), can be used to intercalate the nanoclay with polyamide polymerized from caprolactam, according to the teachings of U.S. Pat. No. 4,739,007, but with the altered step of stopping the reaction before the polymerized monomer grows beyond oligomeric level.

The oligomeric nanonylon used in the present invention should have a weight average molecular weight of nylon, ranging from about 10,000 to about 50,0000, and preferably from about 25,000 to about 35,000.

Organoclays

Organoclays arrive at the cusp of the present invention already as a part of the oligomeric nanonylon. However, the ability to determine which organoclay to use, and hence which oligomeric nanonylon to use, will be possible to a person practicing this invention.

Organoclay is obtained from nanoclay. Nanoclay is a clay from the smectite family. Smectites have a unique morphology, featuring one dimension in the nanometer range. Montmorillonite clay is the most common member of the smectite clay family. The montmorillonite clay particle is often called a platelet, meaning a sheet-like structure where the dimensions in two directions far exceed the particle's thickness.

Nanoclay becomes commercially significant if intercalated with an organic intercalant to become an organoclay. An intercalate is a clay-chemical complex wherein the clay gallery spacing has increased, due to the process of surface modification by an intercalant. Under the proper conditions of temperature and shear, an intercalate is capable of exfoliating in a resin matrix, such as a polyamide. An intercalant is an organic or semi-organic chemical capable of entering the montmorillonite clay gallery and bonding to the surface. Exfoliation describes a dispersion of an organoclay (surface treated nanoclay) in a plastic matrix. In this invention, oligomeric nanonylon has exfoliated organoclay at least to some extent and preferably in excess of that achievable using the conventional melt mixing, process for making polymerized nanonylons.

In exfoliated form, nanoclay platelets have a flexible sheet-type structure which is remarkable for its very small size, especially the thickness of the sheet. The length and breadth of the particles range from 1.5 μm down to a few tenths of a micrometer. However, the thickness is astoundingly small, measuring only about a nanometer (a billionth of a meter). These dimensions result in extremely high average aspect ratios (200-500). Moreover, the miniscule size and thickness mean that a single gram contains over a million individual particles.

Nanocomposites are the combination of the organoclay and the plastic matrix. In polymer compounding, a nanocomposite is a very convenient means of delivery of the nanoclay into the ultimate compound, provided that the plastic matrix is compatible with the principal polymer resin components of the compounds. In such manner, nanocomposites are available in concentrates, masterbatches, and compounds from Nanocor, Inc. of Arlington Heights, Ill. (www.nanocor.com) and PolyOne Corporation of Avon Lake, Ohio (www.polyone.com) in a variety of nanocomposites. Particularly preferred organoclays are I24P, I30P, and I44P from Nanocor, Inc.

With respect to oligomeric nanonylons, as explained above, Nanocor has commercially available an oligomeric nanonylon meeting the specifications of molecular weight, melt flow index, or viscosity as identified above for use in this invention. Other commercial sources are likely to become available as the technology emerges.

Nanocomposites offer flame-retardancy properties because such nanocomposite formulations burn at a noticeably reduced burning rate and a hard char forms on the surface. They also exhibit minimum dripping and fire sparkling.

Moreover, nanocomposites made from nylon as the thermoplastic matrix also have barrier properties useful in films, fibers, and other forms. Barrier properties can be measured as transmission rates, namely for oxygen transmission rates in the units of cc-mil/100 $in^2$-day and for water vapor transmission rates, g-mil/$m^2$-day, respectively. Chain-extended nanonylons made according to the present invention can have oxygen transmission rates ranging from about 2.3 to about 0.5, and preferably from about 0.8 to about 0.5 cc-mil/100 $in^2$-day, when measured at 65% relative humidity. Chain-extended nanonylons made according to the present invention can have water vapor transmission rates ranging from about 325 to about 25, and preferably from about 30 to about 25 g-mil/$m^2$-day.

Nylons

The polyamides useful for making the oligomeric nanonylon can be one or a number of polyamides, (nylons) comprise crystalline or resinous, high molecular weight solid polymers including copolymers and terpolymers having recurring amide units within the polymer chain. Polyamides may be prepared in the presence of organoclays by polymerization, only to an oligomeric level, of one or more epsilon lactams such as caprolactam, pyrrolidone, lauryllactam and aminoundecanoic lactam, or amino acid, or by condensation of dibasic acids and diamines.

Non-limiting examples of polyamide homopolymers and copolymers are polycaprolactam (nylon 6), poly(hexamethylene adipamide) (nylon 6,6), poly(hexamethylene sebacamide) (nylon 6, 10), poly(11-aminondecanoic acid) (nylon 11), poly(12-aminododecanoic acid) (nylon 12) and the like.

Chain Extending Agents

Any commercial chain extending agent that can increase the molecular weight of the nylon oligomers in the oligomeric nanonylon is suitable for use in the present invention.

Non-limiting examples of such chain extending agents are carbodiimides, carbodiimide hydrochlorides, multi-functional epoxies, carbonylbiscaprolactames, and multi-functional acrylic oligomers (such as Cesa-extend brand oligomers from Clariant Additive Masterbatches of Winchester, Va., USA).

Of the above itemized chain extending agents, the following three chain extending agents are preferred: Bruggolen M1251 processing agent from Brueggmann Chemical U.S. Inc. of Newtown Square, Pa., USA; Raschig Stabilizer 9000 polymeric carbodiimide and Raschig Stabilizer 7000 dimeric carbodiimide, both from Raschig GmbH of Ludwigshafen, Germany.

Optional Additives

The chain-extended nanonylon of the present invention can include conventional plastics additives in an amount that is sufficient to obtain a desired processing or performance property for the ultimate thermoplastic compound, but in a manner that does not disrupt the reaction chain extending agents with the oligomeric nanonylon to form the chain-extended nanonylon.

The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the chain-extended nanonylons of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants, micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Optional Polymers

While the chain-extended nanonylon can be made without other polymers present, it is optional to introduce other polymers into the extruder for a variety of ultimate compound properties and performances, but in a manner that does not disrupt the reaction chain extending agents with the oligomeric nanonylon to form the chain-extended nanonylon.

The same polyamide as constitutes the nanonylon can be added if it is desired to dilute the organoclay concentration in the nylon to a specific lower level. Likewise, a blend of thermoplastics can be created at this time of chain extension reaction by using other polyamides or other resins such as those selected from the group consisting of polyolefins, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof. Also, any polymer that is reactive with the chain extending agent(s) can be added into the extruder to form copolymers with the polyamide during reactive extrusion, in order to form a chain-extended copolymeric nanonylon.

Optional Endcapping Agents

Because chain extension begins with reaction at functional groups at the ends of the nylon oligomer, after reaction with the chain extending agents, it is optional to introduce endcapping agents to the extruder to forestall any addition reaction of the ends of the chain-extended nanonylon beyond the desired molecular weight, desired melt flow index, or desired viscosity.

Non-limiting examples of endcapping agents are acetic anhydride, phthalic anhydride, hexamethyl disilazane, acetic acid, and cyclohexylamine.

Table 1 shows ranges of acceptable, desirable, and preferred weight percents of the various ingredients for addition to the extruder, relative to the total weight of the chain-extended nanonylon emerging from the extruder, all being expressed as approximate values. Because the additives, other polymers, and endcapping agents are optional, the low end of each range is zero.

TABLE 1

Weight Percent of Ingredients For Chain Extension Reactive Extrusion

| Ingredients | Acceptable (Wt. %) | Desirable (Wt. %) | Preferred (Wt. %) |
|---|---|---|---|
| Oligomeric Nanonylon | 10-99.5 | 30-950 | 50-90 |
| Chain Extending Agent | 0.5-20 | 0.7-10 | 1-5 |
| Optional Additives | 0-70 | 0-50 | 0-30 |
| Optional Polymers | 0-90 | 0-65 | 0-50 |
| Optional Endcapping Agents | 0-15 | 0-10 | 0-5 |

Chain Extension and Other Extruder Processing

The preparation of compounds of the present invention is uncomplicated. The compound of the present can be made in batch or continuous operations.

Reaction via chain extension in a continuous process for this invention occurs in an extruder that is elevated to a temperature that is sufficient to melt the oligomeric nanonylon and to adequate disperse the chain extending agent and optional additive and optional polymers therewithin.

Extruders have a variety of screw configurations, including but not limited to single and double, and within double, co-rotating and counter-rotating. Extruders also include kneaders and continuous mixers, both of which use screw configurations suitable for mixing by those skilled in the art without undue experimentation. In the present invention, it is preferred for chain extension to use a twin co-rotating screw in an extruder commercially available from Coperion Werner-Pfleiderer GmbH of Stuttgart, Germany.

Extruders have a variety of heating zones and other processing parameters that interact with the elements of the screw(s). Extruders can have temperatures and other conditions according to acceptable, desirable, and preferable ranges as shown in Table 2.

TABLE 2

Processing Conditions

| Condition | Acceptable | Desirable | Preferred |
|---|---|---|---|
| Zones 1-5 Temp. | 210° C.-250° C. | 220° C.-240° C. | 230° C. |
| Zones 6-7 Temp. | 220° C.-260° C. | 230° C.-250° C. | 240° C. |
| Zones 8-9 Temp. | 230° C.-270° C. | 240° C.-260° C. | 250° C. |
| Die Temp. | 240° C.-280° C. | 250° C.-270° C. | 260° C. |
| Screw Rotation | 300-700 rpm | 400-600 rpm | 500 rpm |
| Feeder Rate | 50-95% of available drive torque | 75-95% of available drive torque | 90-95% of available drive torque |

Location of ingredient addition into the extruder can be varied according the desired duration of dwell time in the extruder for the particular ingredient. Table 3 shows acceptable, desirable, and preferable zones when ingredients are to be added in the process of the present invention.

TABLE 3

Ingredient Addition Points

| Ingredient | Acceptable Zone(s) |
|---|---|
| Oligomeric Nanonylon | Throat |
| Chain Extending Agent | Throat |
| Optional Additives | Throat |
| Optional Polymers | Throat or Downstream or Both |
| Optional Endcapping Agents | Downstream |

Extruder speeds can range from about 50 to about 1200 revolutions per minute (rpm), and preferably from about 300 to about 600 rpm.

Typically, the output from the extruder is pelletized for later extrusion or molding into polymeric articles.

The chair-extended nanonylon of the present invention should have a weight average molecular weight of nylon, ranging from about 15,000 to about 80,000, and preferably from about 30,000 to about 60,000. Thus, the weight average molecular weight of the chain-extended nanonylon can be as much as 8-fold the starting weight average molecular weight of the oligomeric nanonylon.

Subsequent Processing

The chain-extended nanonylon made according to the present invention can serve either as a concentrate or as a compound. If the former, then the chain-extended nanonylon is an intermediate product, an ingredient to be added with other ingredients to subsequent compounding steps in a batch or continuous mixing apparatus. The dilution or "let-down" of the concentrate into the compound can result in an organoclay concentration in the compound ranging from about 0.5 to about 10 weight percent, and preferably from about 3 to about 8 weight percent.

Ultimately, the compound is formed into an article using a subsequent extrusion or molding techniques. These techniques are well known to those skilled in the art of thermoplastics polymer engineering. Without undue experimentation but using references such as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using chain-extended nanonylons of the present invention.

USEFULNESS OF THE INVENTION

Chain-extended nanonylons of the present invention are useful for making packaging film; closures; containers of all shapes; impact modified articles; transportation-related molded items (e.g., crash helmets and parts for vehicles such as bumpers and fenders); electrical equipment when flame retardants or reinforcing fillers are also added (e.g., plugs, connectors, boxes, and switches); and consumer appliance housings and containers (e.g., kitchen appliance housings and shells, and consumer electronics housings and cases).

Further embodiments of the invention are described in the following Examples.

EXAMPLES

Rheological tests on sixteen samples of 8% Nanoblend™ nanonylon (PolyOne Corporation, Avon Lake, Ohio, USA), modified with Bruggolen M1251 from Bruggemann Chemical U.S., Inc. of Newtown Square, Pa., USA, Raschig 7000, and Raschig 9000 (both from Raschig GmbH of Ludwigshafen, Germany) were performed to investigate the effect the chain-extending agents have on molecular weight of the in-situ polymerized 8% nanonylon via chain extension.

For purposes of this invention, experimentations with 8% nanonylon are asserted to be establishment of efficacy of the inventive process to chain-extend a nanonylon. This efficacy experiment predicted the results for nanonylon of greater concentrations of organoclay (e.g., about 20%) because of the same chemistry shared by polymerized nanonylon of 8% organoclay concentration and oligomeric nanonylon of 20% organoclay concentration in respect of the reactivity of the nylon ends to the chain extending agents. Table 4 shows the formulations of the eight samples, divided between lettered Comparative Examples and numerical Examples.

TABLE 4

Experimental Formulations (Weight Percent)

| Example | 8% Nanonylon | Bruggolen M1251 | Raschig 7000 | Raschig 9000 |
|---|---|---|---|---|
| A | 100.0 | 0.0 | 0.0 | 0.0 |
| 1 | 99.5 | 0.5 | 0.0 | 0.0 |
| 2 | 99.0 | 1.0 | 0.0 | 0.0 |
| 3 | 98.0 | 2.0 | 0.0 | 0.0 |
| 4 | 98.5 | 0.0 | 1.5 | 0.0 |
| 5 | 97.5 | 0.0 | 2.5 | 0.0 |
| 6 | 98.5 | 0.0 | 0.0 | 1.5 |
| 7 | 97.5 | 0.0 | 0.0 | 2.5 |

All 8 samples were made on a 16 mm Prism co-rotating twin screw extruder made by Thermo Electron Corporation of Stone, U.K. All ingredients were added at the throat. The feeder rate was 7% for Comparative Example A and Examples 4-7 and 6% for Examples 1-3. The temperatures were set at 230° C. for Zones 1-5, 240° C. for Zones 6 and 7, 250° C. for Zones 8 and 9, and 260° C. for the die.

Table 5 shows the numerical results of the rheology studies.

TABLE 5

Rheology Studies Using ASTM No. D4440

| Example | Angular Freq. (rad/s) | Shear Loss Modulus, G', (Pa) | Shear Storage Modulus, G", (Pa) | Complex Modulus, G* (Pa) | Complex Viscosity, (Pa · s) |
|---|---|---|---|---|---|
| Comp. A | 100.0000 | 23564.00 | 41288.00 | 47539.0 | 475.39 |
|  | 56.2340 | 15339.00 | 27992.00 | 31919.0 | 567.61 |
|  | 31.6230 | 10223.00 | 18643.00 | 21262.0 | 672.35 |
|  | 17.7830 | 7052.40 | 12349.00 | 14221.0 | 799.69 |
|  | 10.0000 | 5025.30 | 8087.90 | 9521.9 | 952.17 |
|  | 5.6237 | 3669.60 | 5324.40 | 6466.5 | 1149.90 |
|  | 3.1625 | 2833.20 | 3534.80 | 4530.1 | 1432.50 |
|  | 1.7784 | 2038.10 | 2358.90 | 3117.4 | 1752.90 |
|  | 1.0001 | 1631.40 | 1624.80 | 2302.5 | 2302.30 |
|  | 0.5624 | 1344.10 | 1156.20 | 1773.0 | 3152.60 |
|  | 0.3163 | 1130.90 | 857.73 | 1419.4 | 4488.00 |
|  | 0.1778 | 972.74 | 665.16 | 1178.4 | 6625.90 |
|  | 0.1000 | 859.51 | 545.17 | 1017.8 | 10177.00 |
|  | 0.0562 | 782.22 | 471.27 | 913.2 | 16237.00 |
| 1 | 100.0000 | 30376.00 | 51268.00 | 59591.0 | 595.91 |
|  | 56.2340 | 19523.00 | 35303.00 | 40342.0 | 717.38 |
|  | 31.6230 | 12641.00 | 23829.00 | 26974.0 | 853.00 |
|  | 17.7830 | 8358.20 | 15772.00 | 17850.0 | 1003.70 |
|  | 10.0000 | 5697.80 | 10344.00 | 11810.0 | 1180.90 |
|  | 5.6237 | 4045.70 | 6810.90 | 7921.9 | 1408.70 |
|  | 3.1625 | 3014.70 | 4468.20 | 5390.1 | 1704.40 |
|  | 1.7784 | 2303.90 | 2958.20 | 3749.5 | 2108.40 |
|  | 1.0001 | 1837.40 | 1982.80 | 2703.2 | 2703.00 |

TABLE 5-continued

Rheology Studies Using ASTM No. D4440

| Example | Angular Freq. (rad/s) | Shear Loss Modulus, G', (Pa) | Shear Storage Modulus, G", (Pa) | Complex Modulus, G* (Pa) | Complex Viscosity, (Pa · s) |
|---|---|---|---|---|---|
| | 0.5624 | 1519.50 | 1347.50 | 2030.9 | 3611.30 |
| | 0.3163 | 1299.00 | 935.04 | 1600.5 | 5060.80 |
| | 0.1778 | 1072.00 | 678.97 | 1269.0 | 7135.10 |
| | 0.1000 | 955.13 | 511.09 | 1083.3 | 10800.00 |
| | 0.0562 | 878.13 | 404.67 | 966.9 | 17200.00 |
| 2 | 100.0000 | 34565.00 | 57686.00 | 67248.0 | 672.48 |
| | 56.2340 | 22134.00 | 39832.00 | 45568.0 | 810.33 |
| | 31.6230 | 14258.00 | 26819.00 | 30374.0 | 960.51 |
| | 17.7830 | 9354.90 | 17826.00 | 20132.0 | 1132.10 |
| | 10.0000 | 6323.80 | 11730.00 | 13326.0 | 1332.60 |
| | 5.6237 | 4439.30 | 7692.30 | 8881.4 | 1579.30 |
| | 3.1625 | 3254.20 | 5043.80 | 6002.5 | 1898.00 |
| | 1.7784 | 2468.50 | 3327.20 | 4142.9 | 2329.60 |
| | 1.0001 | 1956.30 | 2220.80 | 2959.6 | 2959.30 |
| | 0.5624 | 1603.10 | 1500.40 | 2195.7 | 3904.10 |
| | 0.3163 | 1299.30 | 1037.90 | 1662.9 | 5258.10 |
| | 0.1778 | 1120.00 | 741.93 | 1343.4 | 7553.70 |
| | 0.1000 | 994.07 | 551.57 | 1136.8 | 11367.00 |
| | 0.0562 | 902.25 | 437.28 | 1002.6 | 17827.00 |
| 3 | 100.0000 | 40332.00 | 65055.00 | 76543.0 | 765.43 |
| | 56.2340 | 25978.00 | 45254.00 | 52180.0 | 927.91 |
| | 31.6230 | 16779.00 | 30719.00 | 35003.0 | 1106.90 |
| | 17.7830 | 11042.00 | 20650.00 | 23417.0 | 1316.80 |
| | 10.0000 | 7413.20 | 13656.00 | 15538.0 | 1553.80 |
| | 5.6237 | 5148.50 | 8990.50 | 10360.0 | 1842.30 |
| | 3.1625 | 3708.80 | 5909.50 | 6976.9 | 2206.10 |
| | 1.7784 | 2769.70 | 3910.40 | 4791.9 | 2694.50 |
| | 1.0001 | 2095.90 | 2595.60 | 3336.2 | 3335.90 |
| | 0.5624 | 1669.40 | 1758.40 | 2424.7 | 4311.30 |
| | 0.3163 | 1380.40 | 1220.60 | 1842.7 | 5826.40 |
| | 0.1778 | 1174.50 | 876.93 | 1465.8 | 8241.60 |
| | 0.1000 | 1015.50 | 675.53 | 1219.7 | 12195.00 |
| | 0.0562 | 870.77 | 590.41 | 1052.1 | 18706.00 |
| 4 | 100.0000 | 27776.00 | 50979.00 | 58055.0 | 580.55 |
| | 56.2340 | 17455.00 | 34381.00 | 38558.0 | 685.66 |
| | 31.6230 | 11171.00 | 22610.00 | 25219.0 | 797.49 |
| | 17.7830 | 7381.00 | 14691.00 | 16441.0 | 924.53 |
| | 10.0000 | 5094.20 | 9453.70 | 10739.0 | 1073.90 |
| | 5.6237 | 3673.40 | 6103.60 | 7123.7 | 1266.70 |
| | 3.1625 | 2786.80 | 3968.80 | 4849.5 | 1533.50 |
| | 1.7784 | 2142.40 | 2590.30 | 3361.5 | 1890.20 |
| | 1.0001 | 1740.30 | 1724.80 | 2450.2 | 2450.00 |
| | 0.5624 | 1458.00 | 1174.50 | 1872.2 | 3329.00 |
| | 0.3163 | 1253.90 | 828.22 | 1502.8 | 4751.60 |
| | 0.1778 | 1104.50 | 611.11 | 1262.3 | 7097.70 |
| | 0.1000 | 992.34 | 479.22 | 1102.0 | 11018.00 |
| | 0.0562 | 897.56 | 413.29 | 988.1 | 17569.00 |
| 5 | 100.0000 | 28386.00 | 52977.00 | 60103.0 | 601.03 |
| | 56.2340 | 17990.00 | 35660.00 | 39941.0 | 710.26 |
| | 31.6230 | 11538.00 | 23478.00 | 26160.0 | 827.23 |
| | 17.7830 | 7782.20 | 15279.00 | 17147.0 | 964.23 |
| | 10.0000 | 5496.30 | 9871.20 | 11298.0 | 1129.80 |
| | 5.6237 | 4018.10 | 6394.50 | 7552.1 | 1342.90 |
| | 3.1625 | 3103.80 | 4160.50 | 5190.7 | 1641.30 |
| | 1.7784 | 2421.90 | 2741.90 | 3658.0 | 2056.90 |
| | 1.0001 | 1993.20 | 1842.80 | 2714.5 | 2714.30 |
| | 0.5624 | 1688.70 | 1269.40 | 2112.6 | 3756.40 |
| | 0.3163 | 1461.70 | 910.73 | 1722.2 | 5445.60 |
| | 0.1778 | 1284.90 | 693.50 | 1460.1 | 8209.70 |
| | 0.1000 | 1133.50 | 588.75 | 1277.3 | 12771.00 |
| | 0.0562 | 997.26 | 541.69 | 1134.9 | 20178.00 |
| 6 | 100.0000 | 75614.00 | 93510.00 | 120260.0 | 1202.60 |
| | 56.2340 | 51575.00 | 68917.00 | 86079.0 | 1530.70 |
| | 31.6230 | 34609.00 | 49563.00 | 60450.0 | 1911.60 |
| | 17.7830 | 23323.00 | 35030.00 | 42084.0 | 2366.50 |
| | 10.0000 | 15687.00 | 24425.00 | 29029.0 | 2902.80 |
| | 5.6237 | 10695.00 | 16839.00 | 19948.0 | 3547.10 |
| | 3.1625 | 7362.90 | 11566.00 | 13711.0 | 4335.50 |
| | 1.7784 | 5183.20 | 7872.70 | 9425.7 | 5300.10 |
| | 1.0001 | 3721.90 | 5357.60 | 6523.6 | 6523.00 |
| | 0.5624 | 2754.70 | 3651.20 | 4573.8 | 8132.80 |
| | 0.3163 | 2106.00 | 2511.80 | 3277.8 | 10364.00 |
| | 0.1778 | 1604.50 | 1743.80 | 2369.6 | 13324.00 |
| | 0.1000 | 1279.70 | 1257.90 | 1794.5 | 17942.00 |
| | 0.0562 | 1038.80 | 975.48 | 1425.0 | 25336.00 |
| 7 | 100.0000 | 127660.00 | 127800.00 | 180640.0 | 1806.40 |
| | 56.2340 | 92226.00 | 98491.00 | 134930.0 | 2399.40 |
| | 31.6230 | 65882.00 | 74432.00 | 99401.0 | 3143.30 |
| | 17.7830 | 46781.00 | 55190.00 | 72349.0 | 4068.40 |
| | 10.0000 | 33088.00 | 40517.00 | 52311.0 | 5231.00 |
| | 5.6237 | 23391.00 | 29504.00 | 37651.0 | 6695.10 |
| | 3.1625 | 16543.00 | 21314.00 | 26981.0 | 8531.70 |
| | 1.7784 | 11741.00 | 15356.00 | 19331.0 | 10870.00 |
| | 1.0001 | 8328.00 | 10992.00 | 13791.0 | 13789.00 |
| | 0.5624 | 5950.90 | 7883.90 | 9877.7 | 17564.00 |
| | 0.3163 | 4299.80 | 5628.70 | 7083.1 | 22396.00 |
| | 0.1778 | 3151.80 | 4064.40 | 5143.2 | 28919.00 |
| | 0.1000 | 2316.50 | 2963.60 | 3761.5 | 37610.00 |
| | 0.562 | 1770.90 | 2255.40 | 2867.5 | 50985.00 |

FIG. 1 and the data show the complex log-viscosity of the control 8% Nanonylon (Comparative Example A) and the various Examples 1-7.

Bruggolen M1251 (Examples 1-3) increased complex log-viscosity at high angular frequencies approximately proportional to loading level. The effect was convergent at low angular frequency and was similar to Comparative Example A at low angular frequencies.

Raschig 7000 (Examples 4 and 5) increased complex log-viscosity only slightly above Comparative Example A, with the increase being proportional to the loading level at low angular frequency.

Raschig 9000 (Examples 6 and 7) produced the largest increase in complex log-viscosity at both loading levels. The increase in viscosity was about a half decade at a loading level of 1.5% and slightly higher at 2.5% loading level.

Figure 2:
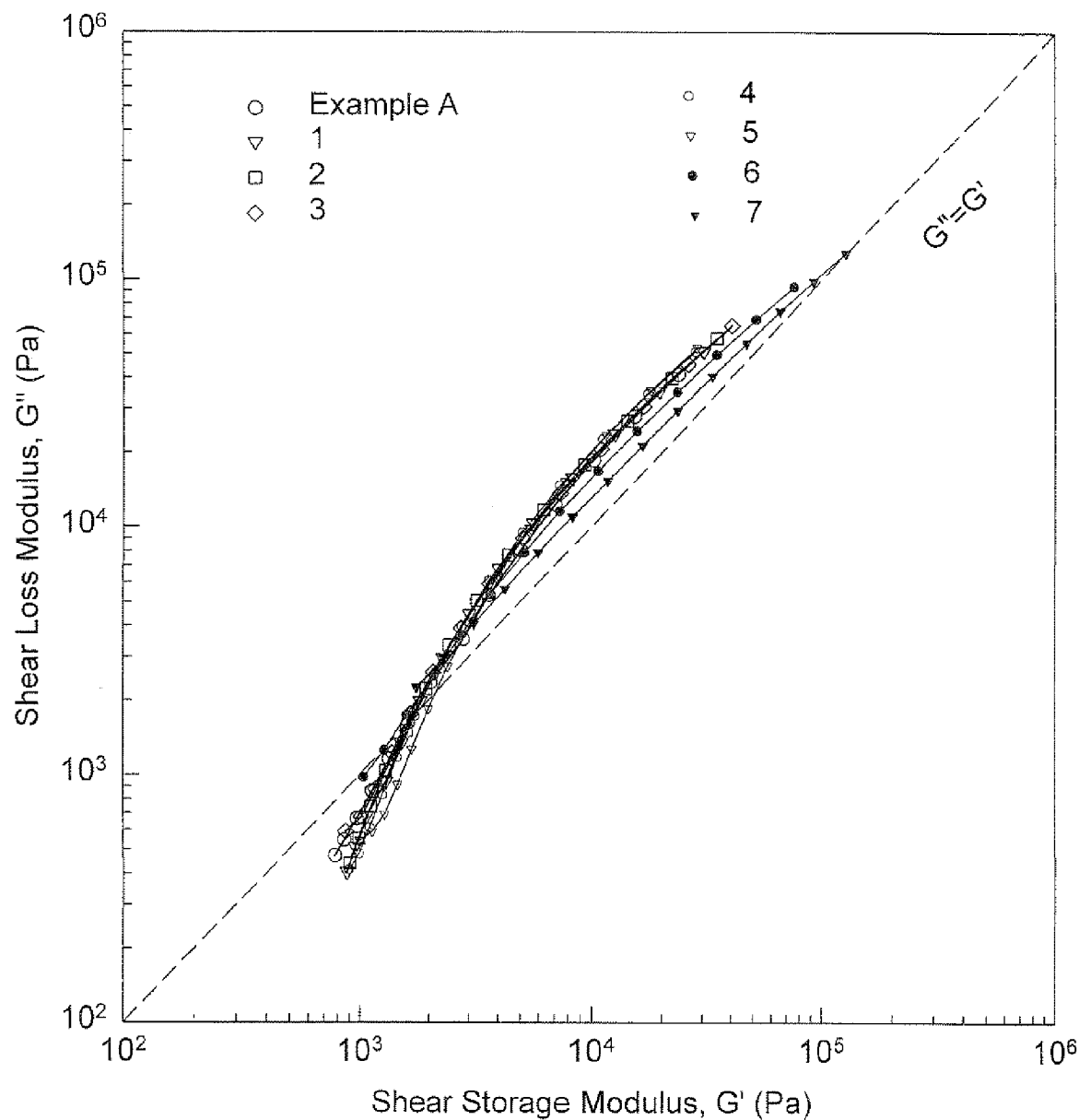
FIG. 2 is a Cole-Cole plot of shear loss modulus vs. shear storage modulus for Comparative Example A and Examples 1-7.

FIG. 2 shows the Cole-Cole plots of the frequency-dependent loss and storage moduli of Comparative Example A and Examples 1-7, using the data from Table 5. Cole-Cole plots are explained in Harrell et al., "Modified Cole-Cole Plot Based on Viscoelastic Properties for Characterizing Molecular Architecture of Elastomers" *Journal of Applied Polymer Science*, Vol. 29, 995-1010 (1984).

Bruggolen M1251 (Examples 1-3) at all loading levels did not significantly shift the curves toward the G"=G' line to indicate long chain branching. Nevertheless, at low shear storage modulus, G', (or short relaxation times), there was a change in curvature towards the G"=G' line, which indicated time/frequency-dependent structural changes. However, there was an increase in complex log-viscosity. Therefore, this indicated an increase in chain extension, as evidenced by an increase complex-log viscosity. There was no evidence of long chain branching, but some time/frequency-dependent structural changes.

Raschig 7000 (Examples 4 and 5), similar to Bruggolen M1251 (Examples 1-3), showed no long chain branching, but there was evidence of structural changes. From the complex log-viscosity curves, there was only a moderate increase, which was attributable mainly to chain extension.

Raschig 9000 (Examples 6 and 7) shifted closer to the G"=G' line with increasing loading levels indicating structural changes associated with long chain branching. At a loading level of 1.5%, there was also some evidence of structural changes, was believed to have arisen from an effect of Raschig 9000 on the nylon-organoclay interaction on branching. That effect was also apparent at a loading level of 2.5%. From the complex log-viscosity curves and the Cole-Cole plots, Raschig 9000 appears to have the greatest amount of chain extension as well as long chain branching, which assists in articles that require good melt strength, such as foamed articles, blow-molded articles, thermoformed articles, calendered articles, and fiberformed articles.

From the Complex modulus, G* versus angular frequency plots, the molecular weight shift factor, alpha or α, was calculated for all samples. The shift factor corresponded to the amount of shift required to superpose the G* versus angular frequency curves onto a reference curve (control) in order to form a master curve. From the shift factors obtained, the molecular weights relative to the control sample were obtained.

From the data, it was clear that Raschig 9000 Examples 6 and 7 produced the greatest percentage of molecular weight increase relative to the control, Comparison Example A. Bruggolen M1251 (Examples 1-3) posted moderate increases in molecular weight whereas Raschig 7000 (Examples 4 and 5) showed the least amount of increase in molecular weight.

Nonetheless, all of Examples 1-7 demonstrated chain extension over Comparative Example A. Table 6 shows the relative increase and percentage increase in molecular weight.

TABLE 6

Increase in Molecular Weight Due to Chain Extension

| | Shift Factor | Indexed Molecular Weight Increase | Percent Molecular Weight Increase |
|---|---|---|---|
| Comparative Example A | 1.0 | — | — |
| Example 1 | 1.4 | 1.10 | 10.40% |
| Example 2 | 1.6 | 1.15 | 14.82% |
| Example 3 | 1.9 | 1.21 | 20.78% |
| Example 4 | 1.1 | 1.03 | 2.84% |
| Example 5 | 1.6 | 1.15 | 14.82% |
| Example 6 | 6 | 1.69 | 69.38% |
| Example 7 | 23 | 2.51 | 151.48% |

The invention is not limited to the above embodiments. The claims follow.

What is claimed is:

1. A process for converting oligomeric nanonylon into chain-extended nanonylon, comprising the step of reacting the oligomeric nanonylon, having an organoclay concentration of greater than 10 percent, with a chain extending agent, selected from the group consisting of carbodiimides, carbodiimide hydrochlorides, multi-functional epoxies, carbonylbiscaprolactames, multi-functional acrylic oligomers, and combinations thereof, to form the chain-extended nanonylon.

2. The process of claim 1, wherein the organoclay concentration exceeds 20 percent by weight.

3. The process of claim 1, wherein the molecular weight of the oligomeric nanonylon ranges from about 10,000 to about 50,000.

4. The process of claim 3, wherein the molecular weight of the oligomeric nanonylon ranges from about 25,000 to about 35,000.

5. The process of claim 1, wherein the oligomeric nanonylon comprises one or a number of polyamides prepared from one or more epsilon lactams.

6. The process of claim 1, wherein the oligomeric nanonylon comprises polycaprolactam (nylon 6), poly(hexamethylene adipamide) (nylon 6,6), poly(hexamethylene sebacamide) (nylon 6, 10), poly(11-aminondecanoic acid) (nylon 11), poly(12-aminododecanoic acid) (nylon 12) and combinations thereof.

7. The process of claim 1, wherein the reaction of the oligomeric nanonylon occurs in the presence of an optional additive selected from the group consisting of optional additives include adhesion promoters; biocides (antibacterials, fungicides, and mildewcides), anti-fogging agents; anti-static agents; bonding, blowing and foaming agents; dispersants; fliers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

8. The process of claim 1, wherein the reaction of oligomeric nanonylon occurs in the presence of another resin selected from the group consisting of polyolefins, polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

9. The process of claim 1, wherein after the reacting step, further comprising the step of reacting an endcapping agent with the chain-extended nanonylon, wherein the endcapping agent is selected from the group consisting of acetic anhydride, phthalic anhydride, hexamethyl disilazane, acetic acid, and cyclohexylamine.

10. The process of claim 1, wherein the oligomeric nanonylon is present in an amount ranging from about 10 to about 99.5 weight percent and the chain extending agent is present in an amount ranging from about 0.5 to about 20 weight percent.

11. A chain-extended nanonylon have a concentration of organoclay exceeding 10 percent by weight of the chain-extended nanonylon, wherein the chain-extended nanonylon is the reaction product of an oligomeric nanonylon and a chain extending agent selected from the group consisting of carbodiimides, carbodiimide hydrochlorides, multi-functional epoxies, carbonylbiscaprolactames, multi-functional acrylic oligomers, and combinations thereof.

12. The nanonylon of claim 1 wherein the oligomeric nanonylon comprises polycaprolactam (nylon 6), poly(hexamethylene adipamide) (nylon 6,6), poly(hexamethylene sebacamide) (nylon 6, 10), poly(11-aminondecanoic acid) (nylon 11), poly(12-aminododecanoic acid) (nylon 12) and combinations thereof.

13. The nanonylon of claim 11, further comprising an optional additive selected from the group consisting of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

14. The nanonylon of claim 11, further comprising another resin selected from the group consisting of polyolefins, polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

15. The nanonylon of claim 11, wherein the nanonylon is endcapped with am endcapping agent selected from the group consisting of acetic anhydride, phthalic anhydride, hexamethyl disilazane, acetic acid, and cyclohexylamine.

16. The nanonylon of claim 11, wherein chain-extended nanonylon comprises oligomeric nanonylon present in an amount ranging from about 10 to about 99.5 weight percent and the chain extending agent present in an amount ranging from about 0.5 to about 20 weight percent.

17. A method of using the chain-extended nanonylon of claim 11, comprising the step of extruding or molding the chain-extended nanonylon into a thermoplastic article.

18. A thermoplastic article comprising chain-extended nanonylon of claim 11.

* * * * *

UNITED STATES PATENT AND TRADEMARK OFFICE
CERTIFICATE OF CORRECTION

| | |
|---|---|
| PATENT NO. | : 7,642,308 B2 |
| APPLICATION NO. | : 12/095962 |
| DATED | : January 5, 2010 |
| INVENTOR(S) | : Joseph C. Golba et al. |

It is certified that error appears in the above-identified patent and that said Letters Patent is hereby corrected as shown below:

Col. 12 Claim 12, line 50, "claim 1" should be changed to -- claim 11 --

Signed and Sealed this

Twenty-third Day of February, 2010

David J. Kappos
*Director of the United States Patent and Trademark Office*